(12) United States Patent
Endo

(10) Patent No.: US 7,492,475 B2
(45) Date of Patent: Feb. 17, 2009

(54) NETWORK APPARATUS WITH DISCRIMINATING LOGIC

(75) Inventor: Yoshinori Endo, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 813 days.

(21) Appl. No.: 10/660,579

(22) Filed: Sep. 12, 2003

(65) Prior Publication Data
US 2004/0100655 A1 May 27, 2004

(30) Foreign Application Priority Data
Sep. 12, 2002 (JP) .............................. 2002-266814

(51) Int. Cl.
*G06K 15/00* (2006.01)
*G06F 3/12* (2006.01)
*H04L 9/00* (2006.01)
(52) U.S. Cl. ...................... 358/1.16; 358/1.9; 358/1.15; 705/56; 705/76
(58) Field of Classification Search ................. 358/1.9, 358/1.15, 1.16; 705/80, 18, 56, 76; 710/8
See application file for complete search history.

(56) References Cited

U.S. PATENT DOCUMENTS 6,707,566 B1 * 3/2004 Endoh ........................ 358/1.15
7,099,026 B1 * 8/2006 Hren .......................... 358/1.15

FOREIGN PATENT DOCUMENTS

| JP | A 08-328777 | 12/1996 |
|---|---|---|
| JP | A-10-187369 | 7/1998 |
| JP | A-11-305966 | 11/1999 |
| JP | A-11-327817 | 11/1999 |
| JP | A-2000-332934 | 11/2000 |
| JP | B2 3200363 | 6/2001 |
| JP | A 2001-282478 | 10/2001 |
| JP | A 2001-306204 | 11/2001 |
| JP | A-2002-007094 | 1/2002 |
| JP | A 2002-165159 | 6/2002 |

* cited by examiner

*Primary Examiner*—Edward L Coles
*Assistant Examiner*—Thomas J Lett
(74) *Attorney, Agent, or Firm*—Oliff & Berridge, PLC

(57) ABSTRACT

When a user wants to set a print density "4", for example, only to a printer A and not a printer B, the user inputs an input command having a printer specifying command and the print density "4" as a corresponding operating condition, and sends the input command to the printer A via a network to which the printers A and B are connected. When the printer A receives the input command, a discriminating program compares its model number "8" stored in a ROM of the printer A with a model number "8" set in the printer specifying command. If the model numbers match, a setting program sets the print density "4" operation condition.

10 Claims, 7 Drawing Sheets

NETWORK APPARATUS WITH DISCRIMINATING LOGIC

BACKGROUND OF THE INVENTION

1. Field of the Invention

The present invention relates to an electronic apparatus such as a printer, a scanner, or a personal computer. More particularly, the invention relates to a network system connecting a plurality of electronic apparatuses.

2. Description of the Related Art

In recent years, so-called network printer systems have been wide spread, in which plural printers are connected to a host computer and each printer is controlled by the host computer.

In the above-mentioned network printer system, a plurality of printers different in model are connected to the host computer, and operation conditions such as print density and the like are set independently for each model. Therefore, when sending and receiving data between the host computer and each of the printers, the host computer first sends an inquiry to inquire the model of the printer to which the host computer will send the data. When the host computer receives the model information from the printer, the host computer sends to the printer data for setting the operation conditions that correspond to the model of the printer.

Further, Japanese Patent Application Publication No. 08-328777 proposes retrieving model information of a printer on a network and uploading unregistered model setting information from a printer, thereby automating a process of registering the model information and the model setting information of each printer into a host computer. Accordingly, printer drivers retained in the host computer can accurately transfer appropriate printing information to each of the printer.

However, even in the method disclosed in Japanese Patent Application Publication No. 08-328777, the data to be set must be sent to a printer of a relevant model. This causes a problem such that if the data is not sent to the printer of the correct model and is mistakenly sent to the printer of another model, data which does not correspond to the model will be set for the printer of the other model, causing an erroneous operation.

SUMMARY OF THE INVENTION

The present invention has been made in view of the above, and an object of the present invention is therefore to provide an electronic apparatus to which, even if an external apparatus does not make inquiries in advance to the electronic apparatus for model information, the external apparatus can reliably set an operation based on operation information for the electronic apparatus without setting operation information for another model.

To achieve the above and other objects, there is provided, according to one aspect of the invention, an electronic apparatus operable in various modes and having a unique identification data, the electronic apparatus including receiving means, discriminating means and setting means. The receiving means is provided for receiving, from an external device, input information including both apparatus information and operation information. The operation information is provided in association with the apparatus information. The operation information is used for setting an operation of an apparatus identified by the apparatus information. The discriminating means is provided for discriminating relevant operation information based on relevant apparatus information that indicates the unique identification data. The relevant apparatus information and the relevant operation information are in association with each other and are received at the receiving means as the input information. The setting means is provided for setting an operation to be performed in a selected mode based on the relevant operation information discriminated by the discriminating means.

According to another aspect of the invention, there is provided a network printer system including a host computer and at least two printers each connected to the host computer through a network. Each printer has its own unique identification data. The host computer outputs to the printers information including both printer information and operation information. The operation information is provided in association with the printer information. Each printer judges if the printer information indicates its own unique identification data and sets an operation in accordance with the operation information provided in association with the printer information when the printer information indicates its own unique identification data.

DETAILED DESCRIPTION OF THE PREFERRED EMBODIMENT

Figure 1:
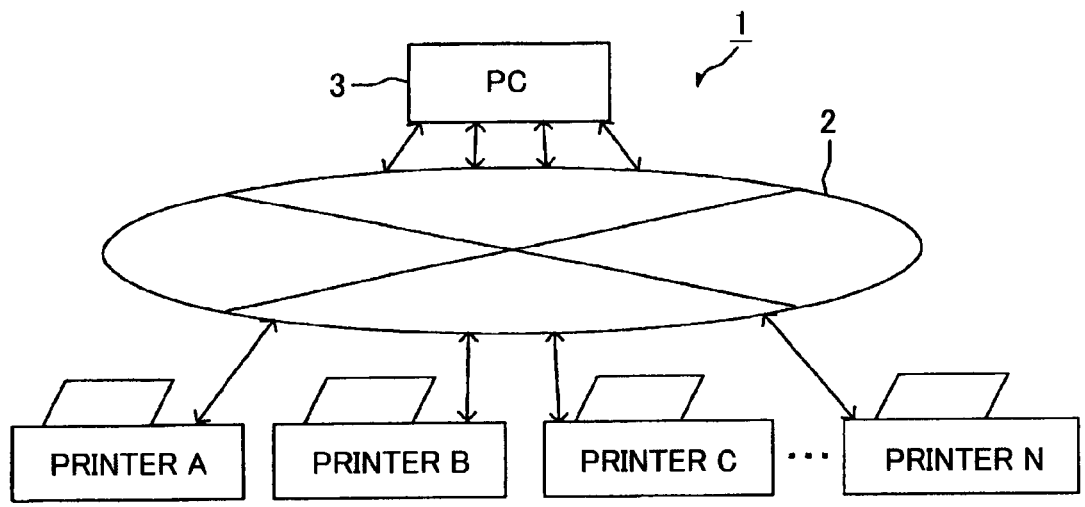
FIG. 1 is a block diagram showing a network printer system structured by a network connected to printers according to an embodiment of the present invention.
Figure 2:
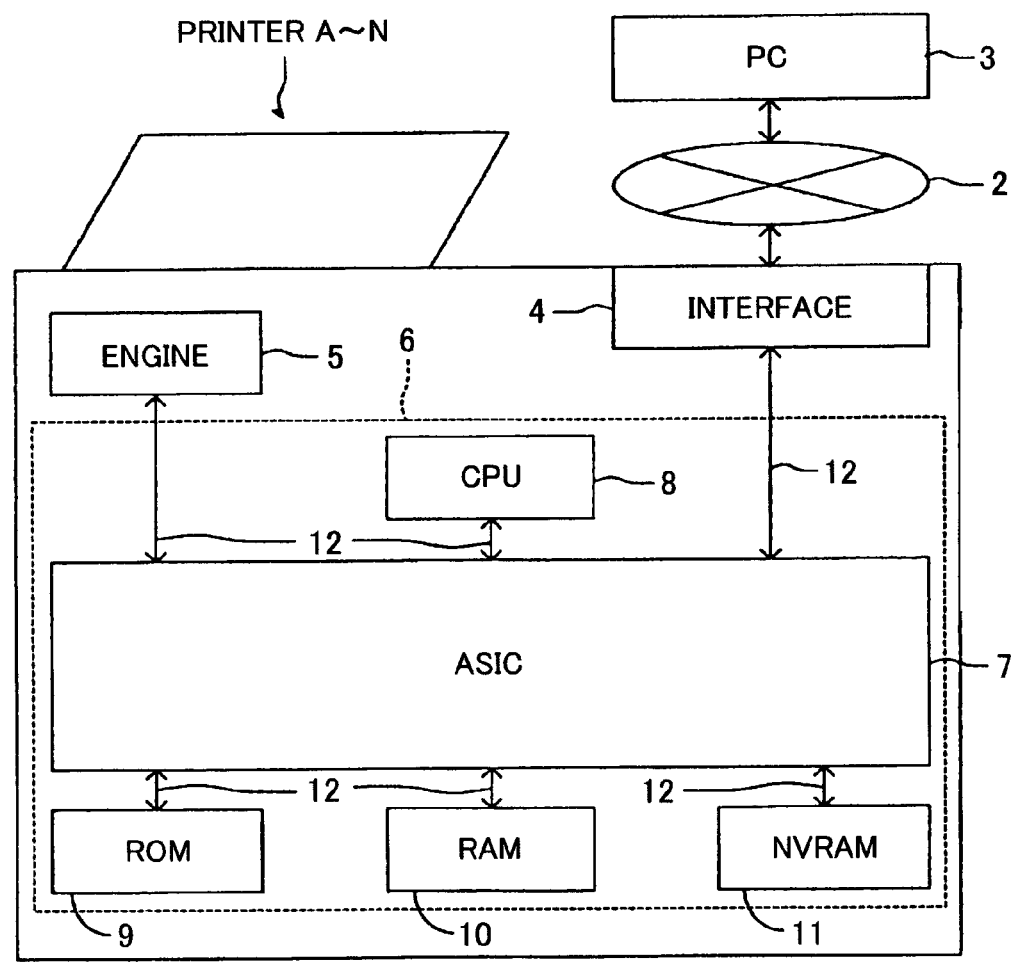
FIG. 2 is a block diagram illustrating an electric configuration of the printers shown in FIG. 1.

FIG. 1 is a block diagram showing a network printer system 1 configured by a network connected to printers in accordance with one embodiment of the present invention. FIG. 2 is a block diagram showing an electronic structure of the printer.

The network printer system 1 includes a network 2 that connects an external personal computer (hereinafter, referred to as "PC") 3, and a plurality of printers (e.g., n number of printers including a printer A, a printer B, . . . a printer N). These printers include printers of the same model, and printers of different models. The network 2 is configured using a LAN or other well known network to connect the PC 3 and the printers A to N.

The PC 3 includes a control unit, a processing unit, a main memory unit, an input device and an output device which are not shown in the diagram. As described below, the user can print data with a desired printer among the printers A to N connected to the network 2.

Each of the printers A to N includes an interface 4 functioning as receiving means, an engine 5, a control unit 6 and the like, and is connected to the network 2 via the interface 4. The engine 5 is constructed with various mechanical elements corresponding to operations performed by the printer. The control unit 6 is provided with an ASIC 7, a CPU 8, a ROM 9 and a RAM 10 serving as memory units, an NVRAM 11 serving as a password storing unit, and the like.

The ASIC 7 is an IC circuit provided to relieve the processing burden on the CPU 8. Inside the control unit 6, the CPU 8, the ROM 9, the RAM 10 and the NVRAM 11 are each connected to the ASIC 7 by a bus 12. The ASIC 7 is also connected to the interface 4 and the engine 5 by the bus 12. The PC 3 is thus connected to the control units 6 of the respective printers A to N via the network 2 and the respective interfaces 4. The CPU 8 executes various programs described below, and controls operations of various parts of each of the printers A to N.

As the model information of the printers A to N, the ROM 9 stores various identification numbers for specifying the printer, including a model number, a password, and a USB ID that includes a product ID and a vender ID assigned to the interface 4. Further, the ROM 9 stores various programs for operating the printer, such as an image formation program for forming images and an input command processing program for processing an input command 13 as input information which is described below. The input command processing program stored in the ROM 9 includes: a discriminating program for discriminating the operation setting command 15 in association with a printer specifying command 14 included in the input command 13; a setting program for setting operations based on the operation setting command 15 discriminated by the discriminating program; and a modification program for modifying the password based on a password modification command 29 included in the input command 13.

The RAM 10 is a volatile memory from which stored information is erased when the printer is turned off or reset. The RAM 10 temporarily stores data for executing the programs. For example, the RAM 10 stores a new password that is processed by the password modification program.

The NVRAM 11 is a nonvolatile memory from which stored information is not erased even when the printer is turned off or reset. The NVRAM 11 stores, for example, a serial ID and important operating conditions (e.g., program processing, page count, etc.) of the printer. Further, the NVRAM 11 is set so that the operating conditions of the operation setting command 15 discriminated by the discriminating program are directly written into the NVRAM 11.

When a user sends a print job data created by the PC 3 to a selected printer, the printer receives the data via the interface 4 and the CPU 8 controls the operations of the mechanical elements constituting the engine 5 based on the image formation program stored in the ROM 9.

Further, the printers A to N are constructed so that various operation conditions for the image formation can be set through the PC 3. For example, when the input command 13 inputted at the PC 3, which serves as the input information for the various operation condition settings, is sent to the printer, the printer receives the input command 13 via the interface 4, and the CPU 8 implements the input command processing program stored in the ROM 9 and thus the input command 13 is processed.

FIGS. 3 through 9 illustrate specific examples of the input command 13 sent from the PC 3. Processing of the input command 13 at each of the printers A to N will be described in detail with reference to FIGS. 3 through 9. In the following description, it is assumed that the input command 13 is sent to two printers A and B connected to the network 2.

Figure 3:
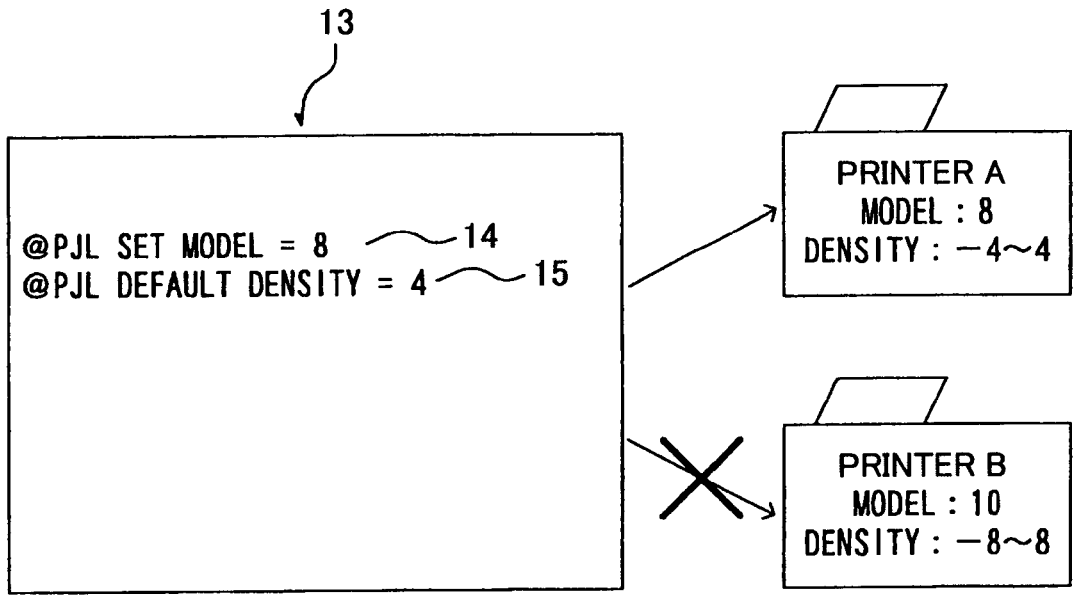
FIGS. 3 is a diagram showing a specific example of an input command sent from a PC.

In FIG. 3, the model numbers of the printers A, B connected to the network 2 are set into the respective ROMs 9 as the model information representative of the model of the printers A, B. For example, "8" is set to the printer A as the model number of printer A, and "10" is set to the printer B as the model number of printer B. Note that, the model numbers of the printers A, B are actually constituted of a combination of numerals and alphabetic letters.

Further, the printer A is set with a print density, as an example of the operation condition. More specifically, the print density is set between a low density and a high density, indicated by a level from −4 to 4, for example. Further, the printer B is also set with a print density as an example of the operation condition. More specifically, the print density of the printer B can also set between a low density and a high density, indicated by a level from −8 to 8, for example.

If the user wishes to set the print density of the printer A to the highest density of "4", the user uses the PC 3 to input the input command 13 including a printer specifying command 14 specifying the model of the printer A, and the operation setting command 15 serving as the operation information to set the operations of the model specified by the printer specifying command 14.

More specifically, as shown in FIG. 3, the following input command 13 is inputted into the PC 3: "@PJL SET MODEL=8" is entered as the printer specifying command 14 for specifying the printer A with the model number "8"; and "@PJL DEFAULT DENSITY=4" is entered as the operation setting command 15 for setting the print density "4" for the printer A indicated in the printer specifying command 14.

When the input command 13 inputted into the PC 3 is sent via the network 2 to the printer A, the printer A receives the input command through the interface 4, and based on the input command processing program, the printer specifying command 14 in the input command 13 is first processed by the discriminating program. That is, the discriminating program compares the model number stored in the ROM 9 of the printer A with the model number set in the printer specifying command 14. In this case, since the model number "8" of the printer A and the model number "8" set in the printer specifying command 14 match each other, the discriminating program discriminates the operation setting command 15 corresponding to the printer specifying command 14. Then, the setting program sets the operation condition to the print density "4".

On the other hand, in the case where the input command 13 is sent over the network 2 to an unintended printer B, the printer B receives the input command 13 through the interface 4. Based on the input command processing program, the printer specifying command 14 contained in the input command 13 is first discriminated by the discriminating program. That is, the discriminating program compares the model number stored in the ROM 9 of the printer B with the model number set in the printer specifying command 14. Since the model number "10" of the printer B and the model number "8" set in the printer specifying command 14 do not match each other, the discriminating program does not carry out the operation command 15 corresponding to the printer specifying command 14.

In other words, in the printers A and B having the above-mentioned input command processing program, the operation condition set in the operation setting command 15 is set only in the case where the model number of the printer stored in the ROM 9 matches the model number set in the printer specifying command 14 contained in the input command 13. Therefore, as described above, it is not necessary for the PC 3 to inquire in advance regarding the model number of the printer A where the operation condition needs to be set. Furthermore, even when the command 13 shown in FIG. 3 is sent to the unintended printer B, the printer B is not set with the operation condition that was indicated by the operation setting command 15 corresponding to the model number of the printer A. In this way, the printer A can be set with the operation condition of the operation setting command 15 corresponding to the printer A.

Further, according to the above-mentioned input command processing program, the discriminating program compares the model number stored in the ROM 9 with the model number set in the printer specifying command 14 contained in the input command 13. When the model numbers do match each other, the discriminating program judges that the operation setting command 15 corresponding to that model number is the operation setting command intended for the printer, and the setting program sets that operation condition. This enables simple and accurate control.

Figure 4:
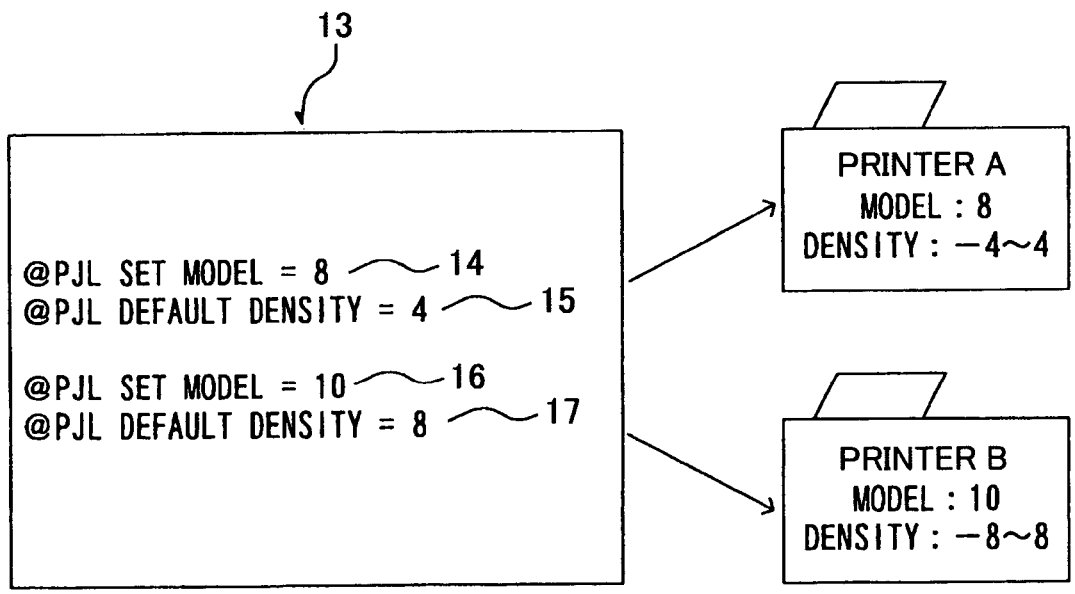
FIG. 4 is a diagram showing a specific example of an input command (i.e., an input command including a plurality of printer specifying commands and operation setting commands) sent from the PC.

Further, in a case where the user wishes to set independent operation conditions for each of the printers A and B on the network 2, the input command 13 includes as shown in FIG. 4: the printer specifying command 14 and the operation setting command 15 for the printer A; and a printer specifying command 16 and an operation setting command 17 for the printer B.

More specifically, in a case where the user wishes to set as the operation condition the highest print density "4" for the printer A and "8" for the printer B, the following are inputted as the input command 13 into the PC 3: "@PJL SET MODEL=8" is inputted as the printer specifying command 14 for specifying the printer A; "@PJL DEFAULT DENSITY=4" is inputted as the operation setting command 15 corresponding to the printer specifying command 14, for setting the print density for the printer A; "@PJL SET MODEL=10" is inputted as the printer specifying command 16 for specifying the printer B; and "@PJL DEFAULT DENSITY=8" is inputted as the operation setting command 17 corresponding to the printer specifying command 16, for setting the print density for the printer B.

When the input command 13 is received by the printers A and B through the interface 4, at the printer A, the model number "8" set in the printer specifying command 14 matches the model number "8" stored in the ROM 9 of the printer A as mentioned above. Therefore, the discriminating program judges that the operation setting command 15 corresponding to the printer specifying command 14 is the operation setting command 15 intended for the printer A, and the setting program sets the print density "4" which is the highest print density for the printer A.

On the other hand, since the model number "10" set in the printer specifying command 16 does not match the model number "8" stored in the ROM 9 of the printer A, the discriminating program judges that the operation setting command 17 corresponding to the printer specifying command 16 is not intended for the printer A. Therefore, the setting program does not set the operation setting command 17. Further, at the printer B, the model number "8" set in the printer specifying command 14 does not match the model number "10" stored in the ROM 9 of the printer B. Therefore, the discriminating program judges that the operation setting command 15 corresponding to the printer specifying command 14 is not intended for the printer B, and the setting program does not set the operation setting command 17. On the other hand, the model number "10" set in the printer specifying command 16 does match the model number "10" stored in the ROM 9 of the printer B. Therefore, the discriminating program judges that the operation setting command 17 corresponding to the printer specifying command 16 is intended for the printer B, and the setting program sets the print density "8" which is the highest density for the printer B.

As described above, even when the printer specifying commands 14 and 16 and the operation setting commands 15 and 17 corresponding to the printer specifying commands 14 and 16, respectively, are inputted collectively as the input command 13 and the input command 13 is sent to both the printers A and B, the printers A and B discriminate the operation setting commands 15 and 17 corresponding to the printer specifying commands 14 and 16 intended for the printers A and B, respectively. Therefore, even when the PC 3 sends a plurality of commands as the input command 13 to the printers A and B having the different model numbers, the printers A and B can accurately set the individual operation setting commands 15 and 17 corresponding to their own model numbers.

Figure 5:
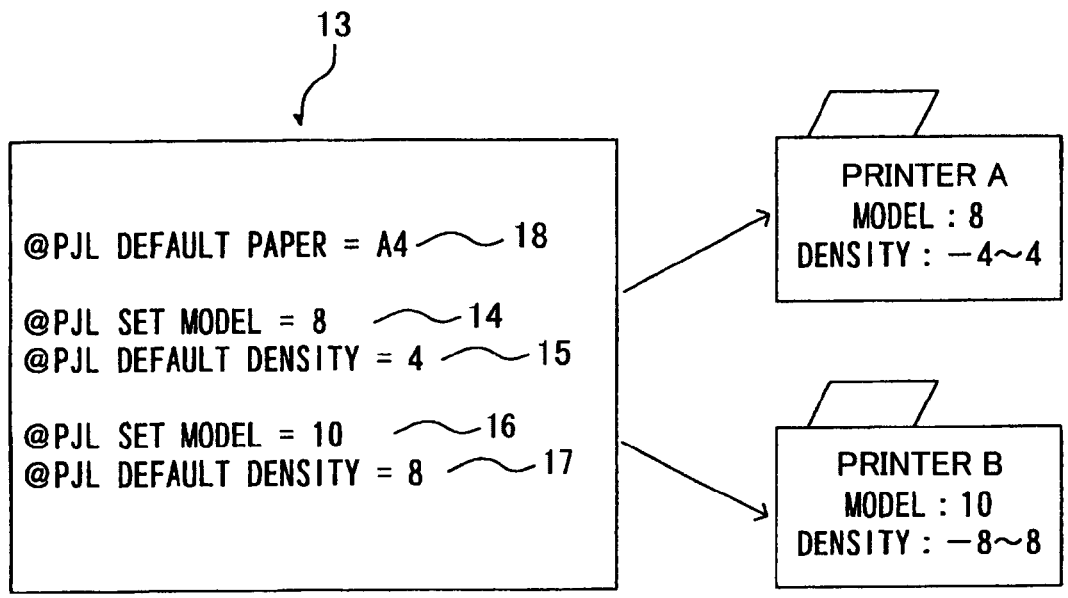
FIG. 5 is a diagram showing a specific example of another input command (i.e., an input command including operation setting commands that do not indicate printer specifying commands) sent from the PC.

Further, when the user wishes to set the same operation condition for both the printers A and B on the network 2, e.g., when the user wishes to set the paper size to A4 as the operation condition for both the printers A and B, the user inputs the input command 13 including "@PJL DEFAULT PAPER=A4" as an operation setting command 18 that does not accompany the printer specifying command (i.e., the printer specifying command is not inputted), as shown in FIG. 5.

When the input command 13 is received through the interface 4 at the printers A and B, the discriminating program judges that the operation setting command 18 that does not accompany the printer specifying command is intended for the printer. Therefore, the setting program sets the A4 paper size for both the printers A and B.

In this way, when the operation setting command 18 that does not accompany the printer specifying command is inputted to both the printers A and B having different model numbers, the operation instructed by the operation setting command 18 can be set to the printers A and B. As a result, the operation setting command 18 can be set more efficiently.

The example shown in FIG. 5 indicates not only the operation setting command 18 that does not accompany the printer specifying command but also the printer specifying commands 14 and 16 and their associated the operation setting commands 15 and 17 as described referring to FIG. 4. Therefore, with the input command 13 shown in FIG. 5, the A4 paper size can be set for the printers A and B. In addition, the discriminating program in the printer A judges that the operation setting command 15 following the printer specifying command 14 is intended for the printer A so that the setting program sets the print density "4". Further, the discriminating program in the printer B judges that the operation setting command 17 following the printer specifying command 16 is intended for the printer B so that the setting program sets the print density "8".

In the above-described examples, the printer specifying commands 14 and 16 are set with the model number as the model information identifying the model of the printers A and B. However, the printer specifying commands 14 and 16 may also be set with a vender ID and a product ID as the model information assigned to the printers A and B. The vender ID and the product ID are ID numbers assigned to the USB which is the interface connecting the PC 3 and the printers A and B.

The vender ID is an ID number assigned to manufacturers manufacturing the printers. Normally, printers manufactured by the same manufacturer are set with the identical vender ID. The product ID is an ID number assigned to each printer model. Normally, the product ID differs in printer models, even when the manufacturer is the same.

Therefore, by setting the vender ID and the product ID instead of the model number in the printer specifying command 14 or 16, the operation condition for the printer A or B on the network 2 can be set according to the manufacturers and also the printer models.

Figure 6:
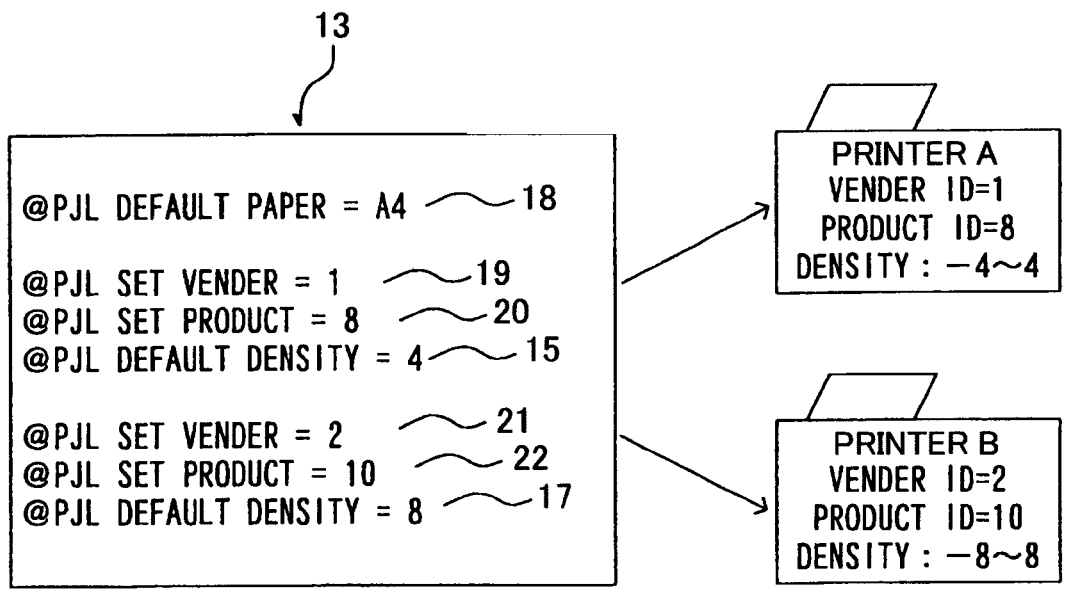
FIG. 6 is a diagram showing a specific example of another input command (i.e., an input command including a vender ID setting command and a product ID setting command) sent from the PC.

As shown in FIG. 6, two printers A and B of different manufacturers and different models are connected to the network 2. In the ROM 9 of the printer A, the vender ID is set to "1" and the product ID to "8". In the ROM 9 of the printer B, the vender ID is set to "2" and the product ID to "10". In this case, the user may wish to set the print density "4" for the printer A and the print density "8" for the printer B. In order to set the operation condition for the printer A, the user inputs the input command 13 including: "@PJL SET VENDER=1" as a vender ID setting command 19 for setting the vender ID for the printer A; "@PJL SET PRODUCT=8" as a product ID setting command 20 for setting the product ID for the printer A; and "@PJL DEFAULT DENSITY=4" as the operation setting command 15 for setting the print density for the printer A identified by the vender setting command 19 and the product ID setting command 20. Further, in order to set the operation condition for the printer B, the input command 13 includes: "@PJL SET VENDER=2" as a vender ID setting command 21 for setting the vender ID of the printer B; "@PJL SET PRODUCT=10" as the product ID setting command 22 for setting the product ID of the printer B; and "@PJL DEFAULT DENSITY=8" as an operation setting command 17 for setting the print density in the printer B identified by the vender ID setting command 21 and the product ID setting command 22.

Like the example shown in FIG. 5, the input command 13 includes "@PJL DEFAULT PAPER=A4" as the operation setting command 18 that does not accompany the vender ID setting command and/or the product ID setting command for specifying the printer. When the input command 13 is received through the interface 4 at the printers A and B, the discriminating program first judges that the operation setting command 18 that does not accompany the vender ID setting command and the product ID setting command is intended for all the printers. Therefore, the setting program in each of the printers A and B sets the A4 paper size.

Next, the vender ID set in the ROM 9 of the printer A is compared with the vender ID set in the vender ID setting command 19. In this case, the vender ID "1" in the ROM 9 of the printer A and the vender ID "1" set in the vender ID setting command 19 do match each other. Therefore, the discriminating program then compares the product ID set in the ROM 9 of the printer A and the product ID set in the product ID setting command 20. In this case, the product ID "8" in the ROM 9 of the printer A and the product ID "8" set in the product ID setting command 20 do match each other. Therefore, the discriminating program then accepts the operation setting command 15 accompanied by the vender ID setting command 19 and the product ID setting command 20.

Then, the setting program sets the operation condition (i.e., the printer density "4") that is judged as being intended for the printer. Further, at the printer A, since the vender ID "2" set in the vender ID setting command 21 does not match the vender ID "1" stored in the ROM 9 of the printer A, the discriminating program judges that the product ID set in the product ID setting command 22 and the operation setting command 17 are not intended for the printer A. At the printer B, since the vender ID "1" set in the vender ID setting command 19 and the vender ID "2" stored in the ROM 9 of the printer B do not match each other, the discriminating program does not accept the product ID set in the product ID setting command 20 and the operation setting command 15.

On the other hand, the vender ID "2" set into the ROM 9 of the printer B and the vender ID "2" set in the vender ID setting command 21 do match each other. Therefore, the discriminating program then compares the product ID set into the ROM 9 of the printer B and the product ID set into the product ID setting command 22. In this case, since the product ID "10" of the printer B and the product ID "10" set in the product ID setting command 22 do match each other, the discriminating program then accepts the operation setting command 17 that follows the vender ID setting command 21 and the product ID setting command 22. Then, the setting program sets the operation condition (i.e., the print density "8") judged as being the operation setting command for the printer B. In this way, simple and reliable control can be accomplished by controlling based on the vender ID and the product ID.

Figure 7:
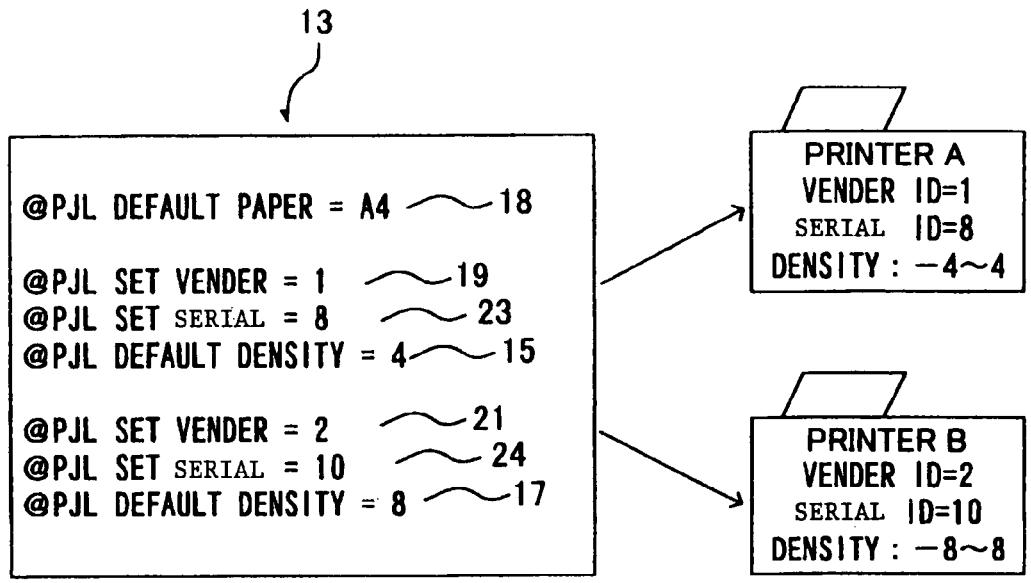
FIG. 7 is a diagram showing a specific example of another input command (i.e., an input command including a vender ID setting command and a serial ID setting command) sent from the PC.

In the example shown in FIG. 6, the vender ID and the product ID are set in the input command 13. However, a serial ID may be set instead of the product ID as shown in FIG. 7. The serial ID is a serial number assigned to the individual printers A and B. The serial ID is typically a combination of alphabetical letters and numerals. It is now assumed that the serial ID "8" is set in the NVRAM 11 of the printer A and the serial ID "10" is set in the NVRAM 11 of the printer B. If these serial IDs are set instead of the product IDs, the operation conditions for the printers A and B can be set individually according to the manufacturer, and also individually for each of the printers A and B.

For example, instead of "@PJL SET PRODUCT=8" as the product ID setting command 20 for setting the product ID of the printer A as shown in FIG. 6, the input command 13 includes "@PJL SET SERIAL=8" as a serial ID setting command 23 for setting the serial ID of the printer A as shown in FIG. 7. Also, instead of "@PJL SET PRODUCT=10" as the product ID setting command 22 for setting the product ID of the printer B as shown in FIG. 6, the input command 13 includes "@PJL SET SERIAL=10" as a serial ID setting command 24 for setting the serial ID of the printer B as shown in FIG. 7.

In addition to the serial ID setting commands 23 and 24, the vender ID setting commands 19 and 21, the operation setting commands 15 and 17, and the operation setting command 18 that does not accompany the vender ID setting commands and the serial ID setting commands, are also included in the input command 13.0

When the input command 13 is received through the interface 4 at the printers A and B, the discriminating program of the printer A first determines that the operation setting command 18 that does not accompany the vender ID setting command and the serial ID setting command as being the operation setting command 18 intended for both the printers A and B. Therefore, the setting programs in the printers A and B set the A4 paper size.

At the printer A, the vender ID set into the ROM 9 of the printer A is compared with the vender ID set in the vender ID setting command 19. In this case, the vender ID "1" of the printer A and the vender ID "1" set in the vender ID setting command 19 do match each other. Therefore, the discriminating program then compares the serial ID set into the ROM 9 of the printer A with the serial ID set in the serial ID setting command 23. In this case, the serial ID "8" of the printer A and the serial ID "8" set in the serial ID setting command 23 do match each other. Therefore, the discriminating program then accepts the operation setting command 15 that follows the vender ID setting command 19 and the serial ID setting command 23. Then, the intended operation setting command, i.e., print density "4", is carried out for the printer A.

The vender ID "2" set in the vender ID setting command 21 does not match the vender ID "1" stored in the ROM 9 of the printer A. Therefore, the discriminating program in the printer A does not accept the serial ID set in the serial ID setting command 24 and the operation set in the operation setting command 17. Further, the vender ID "1" set in the vender ID setting command 19 and the vender ID "2" stored in the ROM 9 of the printer B do not match each other. Therefore, the discriminating program in the printer B judges that the serial ID set in the serial ID setting command 23 and the operation setting command 15 are not intended for the printer B. On the other hand, the vender ID "2" set in the ROM 9 of the printer B and the vender ID "2" set in the vender ID setting command 21 do match each other. Therefore, the discriminating program of the printer B then compares the serial ID set in the serial ID set in the ROM 9 of the printer B and the serial ID set in the serial ID setting command 24. In this case, the serial ID "10" of the printer B and the serial ID "10" set in the serial ID setting command 24 do match each other. Therefore, the discriminating program then carries out the operation setting command 17 that follows the vender ID setting command 21 and the serial ID setting command 24. Then, the operation settings instructed by the operation setting command 17, i.e., print density "8" is carried out by the setting program. In this way, with the use of the vender ID setting command and the serial ID setting command, the control can be performed easily and reliably.

In the input command processing program of the printers A and B, the discriminating program can judge whether the password for writing into the NVRAM 11 is appropriate or not. Only in the case where the password is judged as being appropriate, the setting program can directly write the operation condition into the NVRAM 11.

More specifically, important operation conditions, such as program processing, page count, etc. are typically set into the NVRAM 11. When further operation conditions are to be set into the NVRAM 11, the password is inputted using a password setting command 25 as a part of the input command 13. Operation conditions can be directly written into the NVRAM 11 only in the case where the discriminating programs in the printers A and B judge that the password is correct.

Figure 8:
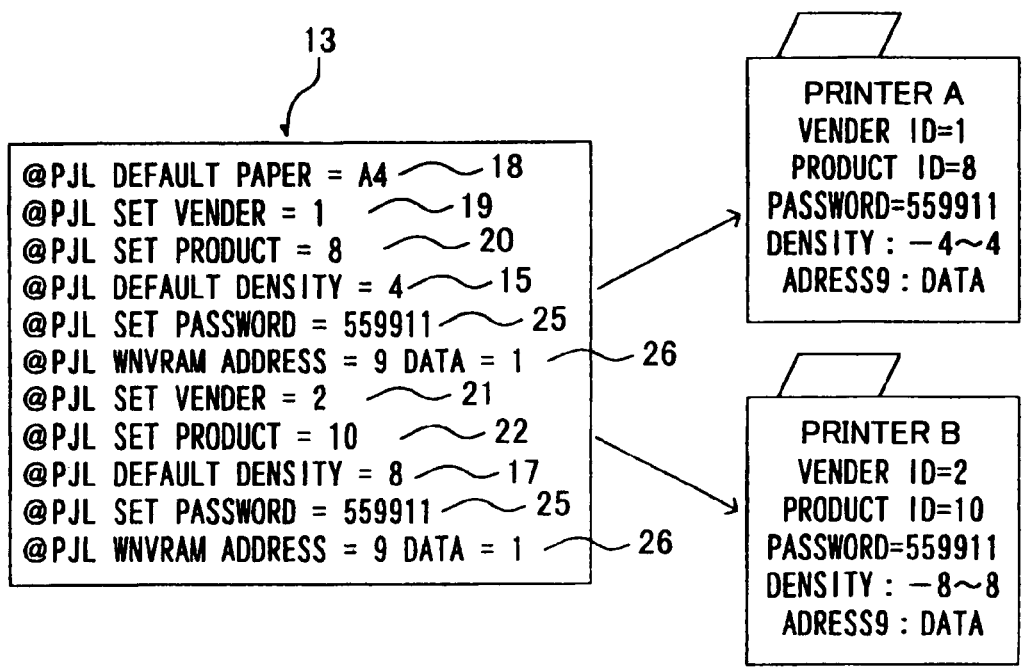
FIG. 8 is a diagram showing a specific example of another input command (i.e., an input command including a password setting command and a NVRAM setting command) sent from the PC.

As shown in FIG. 8, the password "559911" is set into the ROM 9 of the printers A and B. The password is needed when operation conditions are written into the NVRAM 11. Control data for the program processing is stored in the NVRAM 11 of the printers A and B as the operation conditions. If the user wishes to set "1" as the control data for the printers A and B in addition to the input command 13 shown in FIG. 6, the following item is added in the input command 13: "@PJL SET PASSWORD=559911" is inputted as the password setting command 25 after inputting the operation setting command 15; "@PJL WNVRAM ADDRESS=9 DATA=1" is inputted as the printer A NVRAM setting command 26 following the password setting command 25; "@PJL SET PASSWORD=559911" is inputted as the password setting command 25 after inputting the operation setting command 17; and "@PJL WNVRAM ADDRESS=9 DATA=1" is inputted as the printer B NVRAM setting command 26 following the password setting command 25.

When this input command 13 is received through the interface 4 at the printers A and B, the discriminating program first judges that the operation setting command 18 that does not accompany the vender ID setting command 19 or 21 and the product ID setting command 20 or 22 are intended for all the printers. Then, the setting program sets the A4 paper size for the printers A and B.

Next, the discriminating program in the printer A compares the vender ID set into the ROM 9 of the printer A with the vender ID set into the vender ID setting command 19. If these two match each other, the discriminating program compares the product ID set into the ROM 9 of the printer A with the product ID set in the product ID setting command 20. As described above, these two match each other. Therefore, the discriminating program then accepts the operation setting command 15 entered in association with the vender ID setting command 19 and the product ID setting command 20. The setting command sets the operation condition (i.e., print density "4") which is judged as being the operation setting command intended for the printer A.

The discriminating program judges whether the password set in the password setting command 25 is correct. That is, the discriminating program compares the password stored in the ROM 9 of the printer A with the password set in the password setting command 25. In this case, the password "559911" stored in the ROM 9 of the printer A and the password "559911" set in the password setting command 25 match each other. Therefore, the discriminating program judges that the password "559911" set in the password setting command 25 is correct. Next, the setting program sets the NVRAM setting command 26. In other words, "1" is set into the 9th address of the NVRAM 11 as the control data.

Further, the vender ID "1" stored in the ROM 9 of the printer A and the vender ID "2" set in the vender ID setting command 21 do not match each other. Therefore, the discriminating program judges that the subsequent commands (i.e., the product ID set in the product ID setting command 22, the operation setting command 17, the password setting command 25 and the NVRAM setting command 27) are not commands intended for the printer A.

The vender ID "2" stored in the ROM 9 of the printer B and the vender ID "1" set in the vender ID setting command 19 do not match each other. Therefore, the discriminating program in the printer B judges that the product ID set in the product ID setting command 20, the operation setting command 15, the password setting command 25, and the NVRAM setting command 26 are not commands intended for the printer B. On the other hand, the discriminating program in the printer B compares the vender ID set into the ROM 9 of the printer B with the vender ID set in the vender ID setting command 21. When these two match each other, the discriminating program in the printer B compares the product ID set into the ROM 9 of the printer B with the product ID set into the product ID setting command 22. As described above, these product IDs match each other. Therefore, the discriminating program accepts the operation setting command 17 entered in association with the vender ID setting command 21 and the product ID setting command 22, and the setting program sets the operation condition (i.e., print density "8") that is judged as being the operation setting command intended for the printer B.

The discriminating program in the printer B judges whether the password set in the password setting command 25 is correct or not. That is, the discriminating program compares the password stored into the ROM 9 of the printer B with the password set into the password setting command 25. In this case, the password "559911" stored in the ROM 9 of the printer B and the password "559911" set in the password setting command 25 match each other. Therefore, the discriminating program judges that the password "559911" set in the password setting command 25 is correct. Next, the setting program sets the NVRAM setting command 26 entered in association with the password setting command 25. Namely, "5" is set into the 9th address in the NVRAM 11 as the control data.

In this way, when the operation condition is to be set in the NVRAM 11 of the printer A or B, the password setting command 25 and the NVRAM setting command 26 are included in the input command 13. When the input command 13 is received at the interface 4, the setting program sets the operation condition instructed by the NVRAM setting command 26 into the particular storage address in the NVRAM 11 only in the case where the discriminating program judges that the password set in the password setting command 25 is correct. Therefore, unauthorized modification and/or settings of important operation conditions stored in the storage addresses in the NVRAM 11 can be prevented.

According to this processing, the discriminating program compares the password stored in the ROM 9 with the password set in the password setting command 25 contained in the input command 13. When these passwords match each other, it is judged that the password is correct, thereby enabling an easy and reliable judgment.

In the input command processing programs of the printers A and B, the password may be modified by means of a modification program, and the discriminating program can discriminate the modified password.

Typically, the same password is assigned to the products manufactured by the same manufacturer. For example, in a case where the printers A and B are made by the same manufacturer, in other words, the printers A and B are set with the same vender ID "1", they are also set with the same password "559911".

On the other hand, there are instances where the important operation conditions are stored into different storage addresses of the NVRAM 11 depending on the printer model. For example, a data value necessary in the same control may be stored into address #30 in the NVRAM 11 of the printer A and address #16 in the NVRAM 11 of the printer B. In such a case, when the user wishes to set the data value used in the same control in both the printers A and B, the user must specify the printer A in the input command 13, input the password, and then designate the address in the NVRAM 11 of the printer A. After that, the user must specify the printer B, input the password, and then designate the address in the NVRAM 11 of the printer B. Thus, the input processing on the PC 3 side and the processing on the printer side are troublesome.

Therefore, if the modification program is used to change the password that is common to both the printers A and B to passwords that are unique to each of the printers A and B to enable writing to the NVRAM 11 for the printers A and B, the processing can be made more efficient. In the above-mentioned processing, the following are inputted as the input command 13: the password modification command 27 for modifying the password (hereinafter, referred to as the "original password") stored in the NVRAMs 11 of the printers A and B; password setting commands 28 and 30 for setting a new password as the modified password; and NVRAM setting commands 28 and 31 as operation information corresponding to the password setting commands 28 and 30.

At the printers A and B, the password modification command 27 is set as a trigger to execute the modification program, and the discriminating program is set to be able to discriminate the new password modified by the modification program. Further, the modification program can add to the original password the USB address (product ID) that is assigned to the printers A and B. According to this simple processing, the password can be modified to a new password for the product ID that specifies the printer.

Figure 9:
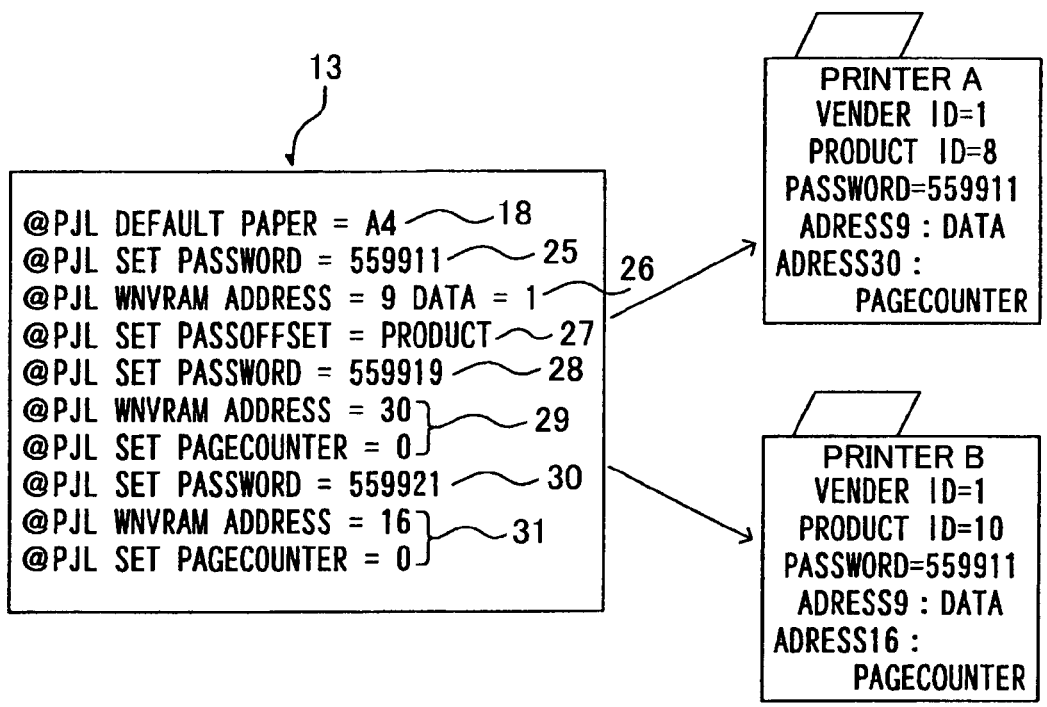
FIG. 9 is a diagram showing a specific example of another input command (i.e., an input command including a password modification command) sent from the PC.

More specifically, as shown in FIG. 9 and as described above, the operation condition is as follows: the program processing control data is stored in the 9th address of the NVRAM 11 in each of the printers A and B; and the page count is stored in the 30th address of the NVRAM 11 in the printer A, and in the 16th address of the NVRAM 11 in the printer B. In this case, when the user wishes to set the control data "1" into both the printers A and B similarly to the above, and the user also wishes to reset the page count of the printers A and B, the user inputs the following as the input command 13: "@PJL SET PASSWORD=559911" is inputted as the password setting command 25 for setting the password shared by the printers A and B; "@PJL WNVRAM ADDRESS=9 DATA=1" is inputted as the NVRAM setting command 26 for setting "1" as the control data stored in the 9th address of the NVRAM 11 in both the printers A and B; and "@PJL SET PASSOFFSET=PRODUCT" is inputted as the password modification command 27 for modifying the password common to both the printers A and B; for the printer A: "@PJL SET PASSWORD=559919" is inputted as the password setting command 28 for setting the new password to be modified by the password modification command 27; and "@PJL WNVRAM ADDRESS=30 PAGECOUNER=0" is inputted as the NVRAM setting command 29 in association with the password setting command 28; and for the printer B: "@PJL SET PASSWORD=559921" is inputted as the password setting command 30 for setting the new password to be modified by the password modification command 27; and "@PJL WNVRAM ADDRESS=16 PAGECOUNER=0" is set as the NVRAM setting command 31 in association with the password setting command 31.

When the above-mentioned input command 13 is received through the interface 4 at the printers A and B, the discriminating program of the printers A and B compares the password "559911" set in the password setting command 25 with the password "559911" stored in the ROM 9 of the printers A and B. In this case, these passwords match each other. Therefore, the NVRAM setting command 26 sets the control data in the 9th address of the NVRAM 11 in the printers A and B to "1".

The password modification command 27 serves as a trigger to execute the modification program. The modification program adds to the original password stored in the ROM 9 of the printers A and B the product ID (or USB address) assigned to the printers A and B, thereby creating the new password. The new password is stored into the RAM 10 of the printers A and B.

Specifically, at the printer A, the modification program adds the printer A product ID "8" to the original password "559911" to set the new password "559919", and this new password "559919" is stored in the RAM 10 of the printer A. Then, the discriminating program compares the new password "559919" with the password "559919" set in the password setting command 28. In this case, the new password "559919" and the password "559919" set in the password setting command 28 match each other. Therefore, the discriminating program then judges that the NVRAM setting command 29 following the password setting command 28 is the command intended for the printer A. Then, the discriminated operation condition (i.e., the page count "0" in the 30th address of the NVRAM 11 in the printer A) is set. As a result, the page count of the printer A is reset.

On the other hand, at the printer A, the password "559921" set in the password setting command 30 does not match the new password "559919" that was modified by the modification program. Therefore, the discriminating program judges that the NVRAM setting command 31 following the password setting command 30 is not the command intended for the printer A.

Further, at the printer B, the modification program adds the printer B product ID "10" to the original password "559911", and the new password "559921" is set. This new password "559921" is stored into the RAM 10 of the printer B. Then, at the printer B, the discriminating program compares the password set in the password setting command 28 with the new password "559921" obtained by the modification program. In this case, since these passwords do not match each other, the discriminating program judges that the NVRAM setting command 29 following the password setting command 28 is not the command intended for the printer B. Next, the discriminating program compares the new password "559921" with the password "559921" set in the password setting command 30. In this case, these passwords match each other. Therefore, the discriminating program then judges that the NVRAM setting command 31 following the password setting command 30 is the command intended for the printer B. Then, the discriminated operation condition (i.e., the page count value "0" in the 16th address in the NVRAM 11 of the printer B) is set, to thereby reset the page count of the printer B.

In accordance with the above-mentioned processing, with the passwords contained in the input command 13, the operation conditions instructed by the NVRAM setting commands 29 and 31 can be set into the NVRAMs 11 of the printers A and B. Further, the original password stored in the ROM 9 is not erased when the printers A and B are turned off or reset. On the other hand, the new password stored in the RAM 10 is in a temporarily stored state. Therefore, the new password is erased when the printers A and B are turned off or reset. Accordingly, when the user turns off or resets the printers A and B not knowing the password was ever modified, the user can modify the password once again starting from the original password.

In accordance with the above-mentioned processing, the modification program adds the product ID of the printers A and B to the original password to create a new password. Therefore, modification of the password can be performed with a simple process, and the operation condition can be written to the NVRAM 11 reliably.

In further accordance with the above-mentioned processing, the operation condition in the NVRAM setting command that is discriminatable due to the password is directly written to the NVRAM 11 as a nonvolatile memory by means of the discriminating program. Therefore, even if the printers A and B are turned off, the operation conditions can be stored in the memory, and important operation condition settings can be secured over a long period of time.

Figure 10A:
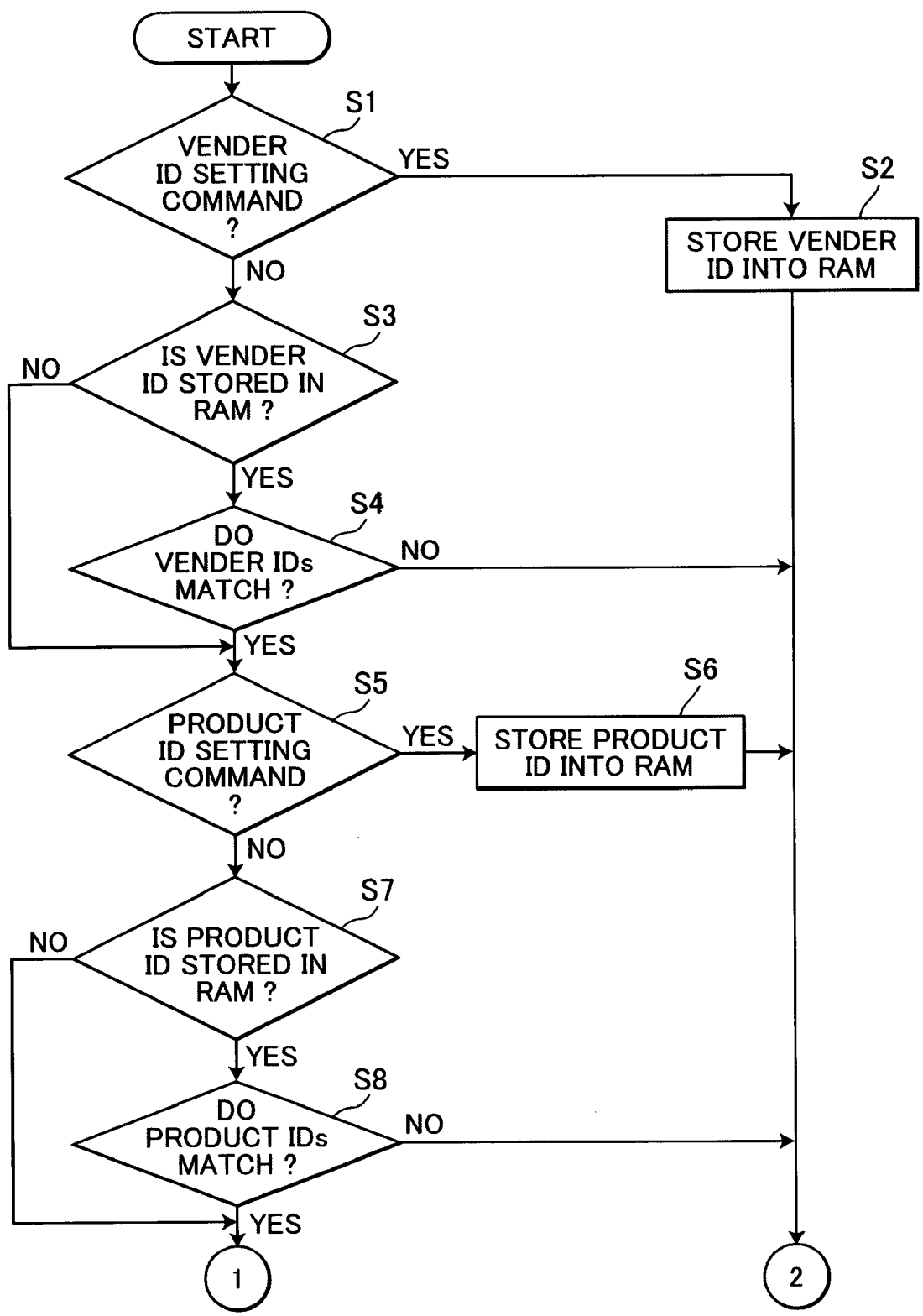
FIG. 10A is a flowchart showing discriminating processing of a program for processing the input commands in FIGS. 8 and 9.
Figure 10B:
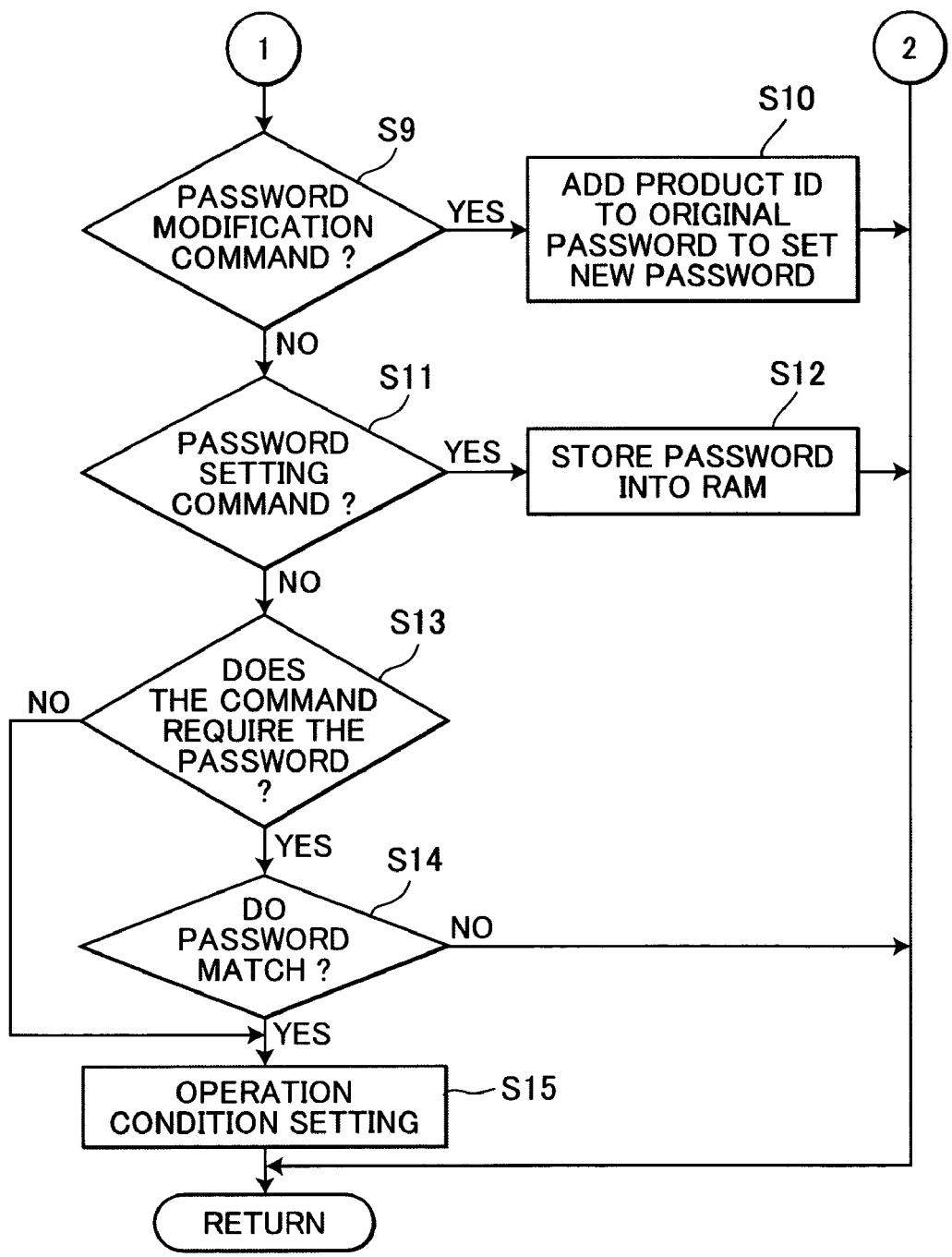
FIG. 10B is a flowchart showing subsequent processing in the discriminating processing shown in FIG. 10A.

FIGS. 10A and 10B are flow charts illustrating the discriminating processing performed by the above-mentioned input command processing program shown in FIGS. 8 and 9.

The flowcharts illustrated in FIGS. 10A and 10B will be described while referring to FIGS. 8 and 9.

In this processing, first, the input command processing program judges whether or not the received input command 13 is the vender ID setting command 19, 21 (S1). If it is the vender ID setting command 19, 21 (S1: YES), then the vender ID set in the vender ID setting command 19, 21 is stored into the RAM 10 (S2), and the processing returns to start. In the discrimination made at S1, if the received input command 13 is not the vender ID setting command 19, 21 (S1: NO), then the input command processing program discriminates based on the vender ID setting command 19, 21 whether or not the vendor ID is stored in the RAM 10 (S3). If the vender ID is not stored in the RAM 10 (S3: NO), then S4 is skipped. If the vender ID is stored in the RAM 10 (S3: YES), then the input command processing program judges whether or not the vender ID in the vender ID setting command 19, 21 stored in the RAM 10 and the vender ID stored in the RAM 9 of the printer A, B match each other (S4).

If the vender ID set in the vender ID setting command 19, 21 and the vender ID stored in the ROM 9 of the printer A, B do not match each other (S4: NO), then the processing returns to start. If the vender ID set in the vender ID setting command 19, 21 and the vender ID stored in the ROM 9 of the printer A, B do match each other (S4: YES), then input command processing program judges that the received input command 13 is the product ID setting command 20, 22 (S5).

If the input command 13 is the product ID setting command 20, 22 (S5: YES), then the product ID set in the product ID setting command 20, 22 is stored into the RAM 10 (S6), and the processing returns to start. In the discrimination made at S5, if the input command 13 is not the product ID setting command 20, 22 (S5: NO), then the input command processing program judges based on the product ID setting command 20, 22 whether or not the product ID is stored in the RAM 10 (S7). If the product ID is not stored in the RAM 10 (S7: NO), then S8 is skipped. If the product ID is stored in the RAM 10 (S7: YES), then the input command processing program judges whether or not the product ID stored in the RAM 10 and the product ID stored in the ROM 9 of the printer A, B match each other (S8).

If the product ID set in the product ID setting command 20, 22 and the product ID stored in the ROM 9 of the printer A, B do not match each other (S8: NO), then the processing returns to start. If the product ID set in the product ID setting command 20, 22 and the product ID stored in the ROM 9 of the printer A, B do match each other (S8: YES), then the input command processing program judges whether or not the received input command 13 is the password modification command 27 (S9).

If the input command 13 is the password modification command 27 (S9: YES), then the product ID assigned to the interface 4 of the printer A, B is added to the original password stored in the ROM 9 of the printer A, B to create the new password (S10). On the other hand, in the discrimination made at S9, if the input command 13 is not the password modification command 27 (S9: NO), then the input command processing program then judges whether or not the input command 13 is the password setting command 25, 28, 30 (S11).

If the input command 13 is the password setting command 25, 28, 30 (S11: YES), then the password is stored into the RAM 10 of the printer A, B (S12) and the processing returns to start. If the input command 13 is not the password setting command 25, 28, 30 (S11: NO), then the input command processing program judges whether or not the input command 13 is a command requiring the password to set the operation conditions (S13).

If it is the command requiring the password (S13: YES), then the input command processing program judges whether or not the password stored in the RAM 10 at S12 matches the password stored in the ROM 9 of the printer A, B or the new password if the password is modified at S10 (S14). If the received password and the password in the printer A, B do not match each other (S14: NO), then the processing returns to start. If the received password and the password in the printer A, B do match each other (S14: YES), then the operation condition is executed (S15). Further, in the discrimination made at S13, if it is judged that the input command 13 does not require the password (S13: NO), then the operation condition is executed (S15) without judging whether or not the passwords match at S14. As described above, the discriminating processing for commands of the input command processing program is executed.

Although the present invention has been described with respect to specific embodiment, it will be appreciated by one skilled in the art that variety of changes and modifications may be made without departing from the scope of the invention. For example, in accordance with the above embodiment, description has been made taking printers as an example of electronic apparatuses. However, the present invention is not limited to the printers but is applicable to other electronic apparatuses such as scanners or personal computers.

In accordance with the above embodiment, description has been made assuming that two printers A and B are on the network 2. However, three or more printers may be connected to the network 2. In such a case, it is possible to set the same operation setting command for, for example, three printers A, B, and C, and then set corresponding operation setting commands for two printers A and B. In other words, as shown in FIG. 5, in the case where the printers A, B and C are connected to the network 2, an operation setting command 18 that does not indicate the printer specifying command can be inputted into the three printers A, B, and C respectively. Then, the printer specifying commands 14 and 16 and the corresponding operation setting command 15, 17 can be inputted to the printers A and B. Accordingly, the shared operation setting command is inputted into the printer A, B and C, and the printers A and B are set with the operation setting commands 15 and 17 which are not set for the printer C. Further, it is also possible to set the operation setting command for the printer C which is different from the two printers A and B.

Further, in accordance with the above embodiment, the new password, which is produced by the modification program modifying the original password, is stored into the RAM 10 by means of the modifying program. However, it is also possible to set the new password as a flag in the RAM 10 and turn this flag on and off in order to set and erase the password.

Further, in accordance with the above embodiment, it is also possible to prepare a product ID setting command, a serial ID setting command and the like, along with commands for canceling each of these or a command for canceling all of these, so that each ID setting command can be invalidated.

What is claimed is:

1. A printing apparatus operable in various modes and having a unique identification data, comprising:
   a storage section that stores the unique identification data, the unique identification data including at least a vendor ID assigned to a manufacturer of the printing apparatus and a product ID assigned to the printing apparatus as model information,
   a password storing section that stores a unique password,
   a receiving section that receives, from an external device, input information including apparatus information, operation information provided in association with the apparatus information and a password, the operation information being used for setting an operation of an apparatus identified by the apparatus information;
   a discriminating section that judges whether the password is appropriately input by comparing the password to the stored unique password and discriminates relevant operation information based on relevant apparatus information indicating the unique identification data, the relevant apparatus information and the relevant operation information being in association with each other and received at the receiving section as the input information;
   wherein the apparatus information received at the receiving section includes a vendor ID and a product ID of the target printing apparatus, and when the vendor ID and the product ID included in the apparatus information are in coincidence with the corresponding IDs stored in the storage section, the discriminating section discriminates the relevant operation information,
   a setting section that sets an operation to be performed in a selected mode based on the relevant operation information discriminated by the discriminating section and if the discriminating section judges that the password is entered correctly,
   a changing section that changes the unique password to a new unique password based on a command, the command being further includes in the input information and changing the unique password stored in the password section and the discriminating section discriminates the new unique password.

2. The printing apparatus according to claim 1, wherein the input information includes a plurality of pieces of apparatus information and a plurality of pieces of operation information in association with respective ones of the plurality of pieces of apparatus information individually, and wherein the discriminating section discriminates relevant apparatus information that indicates the unique identification data from among the plurality of pieces of apparatus information, and discriminates relevant operation information corresponding to the relevant apparatus information.

3. The printing apparatus according to claim 1, wherein the input information further includes independent operation information, the discriminating section judges that the independent operation information being relevant in setting an operation to be performed in a selected mode.

4. The printing apparatus according to claim 1, wherein the discriminating section compares the apparatus information included in the input information with the unique identification data stored in the storage section, and judges that the operation information in association with the model information is relevant when the apparatus information included in the input information matches the unique identification data stored in the storage section.

5. The printing apparatus according to claim 4, further comprising an interface for connecting to the external device, the interface being assigned with a unique ID number, the unique ID number being used as the unique identification data,
   wherein the storage section stores the unique ID number; the external device transmits input information including an ID number and operation information in association with the ID number; the discriminating section compares the ID number included in the input information with the unique ID number stored in the storage section and judges that the operation information provided in association with the ID number is relevant in setting an operation to be performed in a selected mode when the ID number included in the input information matches the unique ID number stored in the storage section.

6. The electronic apparatus according to claim 5, further comprising a nonvolatile memory and a volatile memory, wherein the unique password is stored in the nonvolatile memory and the new unique password is stored in the volatile memory.

7. The printing apparatus according to claim 5, wherein the changing section provides the new unique password based on the unique password and the ID number assigned to the interface.

8. The printing apparatus according to claim 6, wherein the discriminating section directly writes to the nonvolatile memory an operation based on the operation information discriminated using the password.

9. A network printer system comprising:
a host computer; and
at least two printers each connected to the host computer through a network and having its own unique identification data and unique password that is stored within a memory of the printer, the unique identification data including at least a vendor ID assigned to a manufacturer of the printer and a product ID assigned to the printer as model information, the host computer outputting to the at least two printers information including printer information, operation information provided in association with the printer information and a password, the printer information includes a vendor ID and a product ID of a target printer, each of the at least two printers judging if the password is appropriately input by comparing the password to the stored unique password and judging whether the vendor ID and product ID included in the printer information indicates its own corresponding IDs stored in memory, setting an operation in accordance with the operation information provided in association with the printer information when the printer information indicates its own unique identification data and changing the unique password to a new unique password based on a command, the command also output by the host computer and changing the unique password and discriminating the new unique password.

10. The network printer system according to claim 9, wherein the information further includes a password, each of the at least two printers having its own password, judging whether or not the password included in the information is in coincidence with the its own password, and setting the operation in accordance with the operation information provided in association with the printer information when the printer information indicates its own unique identification data and the password included in the information is judged to be in coincidence with the its own password.

* * * * *

UNITED STATES PATENT AND TRADEMARK OFFICE
CERTIFICATE OF CORRECTION

| | |
|---|---|
| PATENT NO. | : 7,492,475 B2 |
| APPLICATION NO. | : 10/660579 |
| DATED | : February 17, 2009 |
| INVENTOR(S) | : Yoshinori Endo |

It is certified that error appears in the above-identified patent and that said Letters Patent is hereby corrected as shown below:

At Col. 17, line 8, claim 6, please change "electronic apparatus" to "printing apparatus".

Signed and Sealed this

Fifth Day of May, 2009

JOHN DOLL
*Acting Director of the United States Patent and Trademark Office*